Oct. 30, 1934.  Z. LITTMAN  1,978,498
VEHICLE SUSPENSION MECHANISM
Original Filed June 28, 1929   6 Sheets-Sheet 1

Oct. 30, 1934.    Z. LITTMAN    1,978,498
VEHICLE SUSPENSION MECHANISM
Original Filed June 28, 1929    6 Sheets-Sheet 4

Oct. 30, 1934.                Z. LITTMAN                1,978,498
VEHICLE SUSPENSION MECHANISM
Original Filed June 28, 1929        6 Sheets-Sheet 6

Patented Oct. 30, 1934

1,978,498

UNITED STATES PATENT OFFICE 1,978,498

VEHICLE SUSPENSION MECHANISM

Zeno Littman, New York, N. Y.

Application June 28, 1929, Serial No. 374,410
Renewed March 7, 1934

22 Claims. (Cl. 280—104)

My invention relates to supporting and equalizing mechanism having in its broader aspect a great variety of practical applications, including the equalized or stabilized support of floating structures.

In the present embodiment it is adapted for the support or "suspension" of a motor-vehicle body, or chassis frame. In this embodiment or adaptation the principal features, objects, or advantages of the invention include:

The support of the frame upon the axles in such manner that the frame or body is practically stabilized against lateral or longitudinal tilting or pitching, and especially such tilting or pitching motions as are ordinarily caused by the rise of only one wheel at a time, and which cause the greatest discomfort to passengers. Such supporting means or arrangement includes one or more transverse or longitudinal equalizers, which in effect reduce the "motion" applied to the chassis when one wheel rises; and also auxiliary or supplemental spring supporting means, intermediate the main springs and the chassis, which greatly reduce the lift of the chassis when two wheels (as, both front, or both rear wheels) are thrown upward at the same time. In addition to the equalizing means I preferably provide stabilizing means which definitely controls or maintains the horizontal position of the chassis when one wheel only is thrown upward. This supporting or "suspension" mechanism eliminates the necessity for "shock absorbers" and also nearly or entirely eliminates strains which ordinarily cause chassis-frame distortion (or twisting), thus directly reducing body-distortion, noises, etc., and indirectly further reducing such disadvantages and permitting simplification and economy in the body structure, by enabling the use of a practically rigid frame. The stabilizing mechanism also includes, when desired, means for reducing longitudinal pitching or tilting by causing the rear end of the chassis to be elevated to practically the same extent as the front end, when the front is raised by a considerable simultaneous "lift" of the front wheels, and vice versa. The equalizing mechanism also acts under practically all possible conditions to apply substantially equal portions of the chassis weight to both front wheels and to both rear wheels, thus tending to keep the wheels always in contact with the road surface and with equal pressure, thus reducing tire wear, and tendency to skidding, and increasing the efficiency of braking, whether brakes are on all wheels or rear wheels only.

The characteristics and advantages of the invention are further sufficiently explained in connection with the following detail description of the accompanying drawings, which show representative embodiments. After considering these examples, skilled persons will understand that many variations may be made without departing from the principles disclosed and I contemplate the employment of any structures that are properly within the scope of the appended claims.

Referring first to Figs. 1 to 7 inclusive, the chassis frame, (or body-supporting frame) includes side members 20, usually of channel section, and any necessary cross-connecting members. For the purposes of the invention in this particular form, the cross frame members include a member 21 near the front, or specifically as shown, nearly over the front axle 22, and a rearward member 23 nearly over the rear axle-housing 24, the members 21—23 being parts of the stabilizing mechanism. There is also practically at the front end of the chassis frame a cross bar or auxiliary spring shaft 25 mounted to oscillate in bearings 26 on the side members 20, and at the rear end a similar bar or shaft 27 mounted in bearings 28. These shafts are parts of the equalizing mechanism. The terms "equalizing" and "stabilizing" are herein used largely for purposes of convenient explanation and distinction between principal parts or sub-combinations of the entire mechanism, but without necessary limiting significance, since in one aspect of the invention the entire mechanism acts together to perform the desired spring-action-equalizing and chassis-frame-stabilizing functions.

Figure 1:
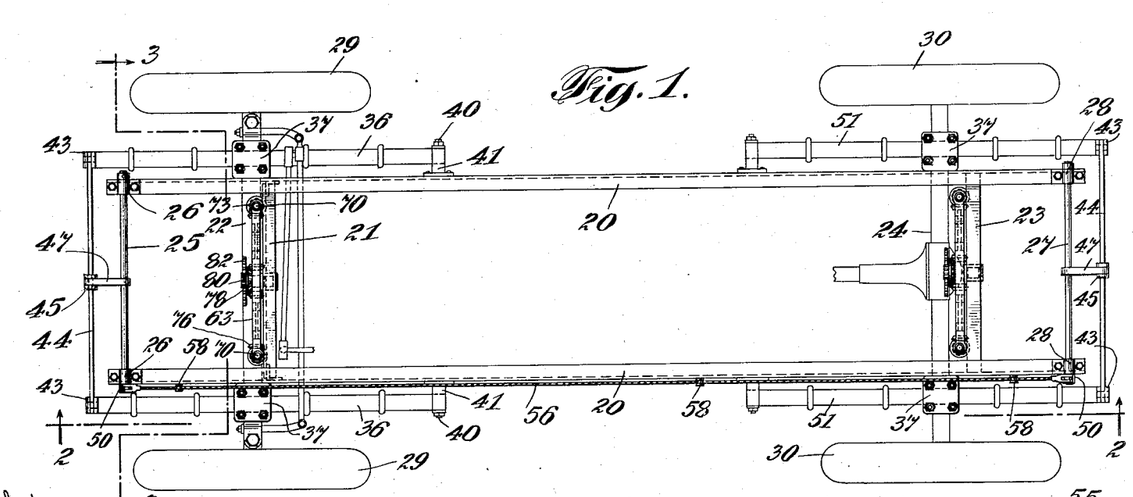
Fig. 1 is a top plan of a motor vehicle chassis embodying the invention in one form.
Figure 2:
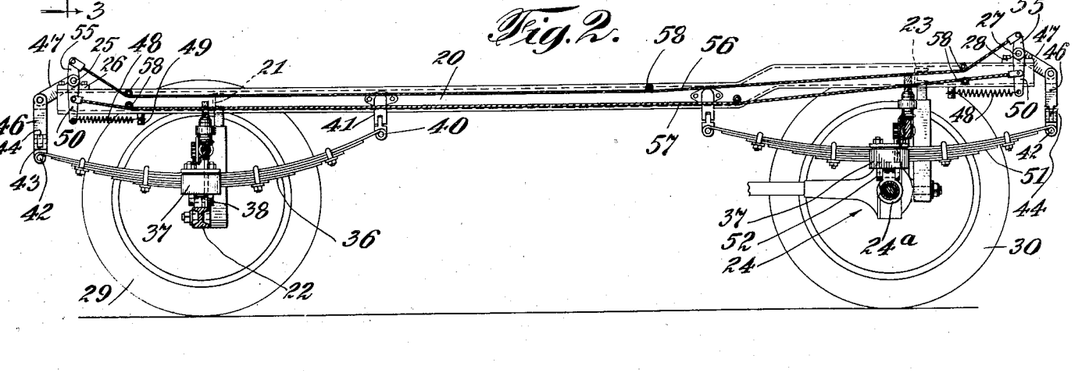
Fig. 2 is a section at 2—2, Fig. 1.

The front wheels 29 and rear wheels 30 may be mounted on the axles as usual. The axles however preferably include special structural features. One such feature is designed to prevent torque effects caused by spring deflection being conveyed through the axle from one of its ends to the other or to the central portion of the axle. Thus, the front axle 22 includes end portions 31 carrying the steering yokes, and a central portion 32 provided with round bars or shafts 33 extending into tubular formations of the axle end members 31 so that the latter may revolve in relation to the central section and to each other. The end portions are prevented from displacement in any suitable way, as by studs 34 engaging in annular channels 35 in the bars 33. The rear axle shaft housings are provided with revoluble sleeves 24ª on which the central portions of the rear springs are mounted, as will appear.

While the invention is not necessarily limited as to the type of main supporting springs, I usually prefer to use multi-leaf springs of the semi-elliptic (or approximately "flat") type. The front springs 36 of this type have their central portions suitably secured in seats 37 which are pivotally mounted at 38 on the axle end portions 31, the pivot axis being longitudinal. The rear ends of the springs are preferably mounted on pins or shackle bolts 40 in fixed position and carried by frame brackets 41. Any other suitable type of mounting for the rear ends of the springs may be substituted, it being only necessary that the rear ends of the springs take the thrust through the chassis and that they be so mounted as to definitely support the chassis on the rear spring ends without any considerable relative lateral tilting of the frame in relation to the spring ends. The eyes at the front ends of the front springs are connected by pins or shackle bolts 42 to shackles 43, and an equalizing cross bar 44 has its ends pivotally mounted in clevises in the shackles, thus providing freedom of movement of the spring end in relation to the cross bar in two directions or planes. At the center the cross bar is connected by a shackle 45 similar to 43 and a link 46 to the end of a short lever arm 47, which is fixed at the center of the transverse spring shaft 25, above referred to.

The "divided" front axle, or the relatively revoluble spring supports (sleeves) on the rear axle, are advantageous and important aside from the equalizing mechanism, since they prevent any rotary forces caused by spring deflection from being conveyed to or through the axle as a whole, or from one spring to the other, and thus spring breakage and axle twisting or fracture are greatly reduced or eliminated.

The articulated connection of the spring seats to the axle members, as at 38, also prevents torsional strains being applied to the springs by axle tilting, and another prolific source of spring breakage, wear, squeaking, etc., is eliminated.

Suitable spring means is provided to support the front end of the chassis through shaft 25 and the described linkage on the equalizing bar 44. In the present example, two relatively heavy helical contractile springs 48 are arranged under the side frame members 20 with their rear ends connected to the long arms of levers 50 fixed on the outer ends of shaft 25.

The rear springs 51 have their central portions bolted into spring seats 37 substantially the same as those of the front springs and similarly pivotally mounted at 52 on the rear axle sleeves 24ª, so that rotation of either sleeve incident to spring deflection is not communicated to the axle housing or to the spring supporting sleeve at the other end of the housing. The front and rear mountings of the rear springs, cross equalizing bar, connection to rear spring shaft 27 and other details of the cushion support and equalizing structure at the rear end of the chassis are substantially the same as the front construction, as just above described, and identified by similar numerals, the only difference being that the parts at the rear are in relatively reversed positions, as clearly understood from Figs. 1 and 2.

If necessary or desirable, strut rods or lever arms may be operatively interposed between either axle and the frame, and when used will usually have their points of articulated connection to the frame in lateral alignment with the rear shackle connections of the front springs or front connections of the rear springs. Such strut rods are however, in many cases unnecessary.

The equalizing structures as so far described provide for lateral equalization, that is for what I call equalization of the main spring action as between the two front springs or the two rear springs. Although not essential in all cases, I prefer to provide also in some cases what I call for convenience longitudinal equalizing means providing equalizing action, or at least an interaction, between the front and rear springs at each side of the chassis. For this purpose the levers 50 have short arms 55 extending above the shaft centers. The short lever arms 55 at the front and rear of each side of the chassis are interconnected by a suitable linkage, sufficiently here represented by a stout and practically unstretchable steel cable 56 of small diameter, and similarly the long arms 50 are connected at points the same distance below the respective shafts 25 and 27 by a similar cable 57, the cables being suitably guided along the side frame members 20, as by small pulleys 58 thereon. The action of these longitudinal equalizers will be explained in the general operative description hereafter.

Figures 8, 10:
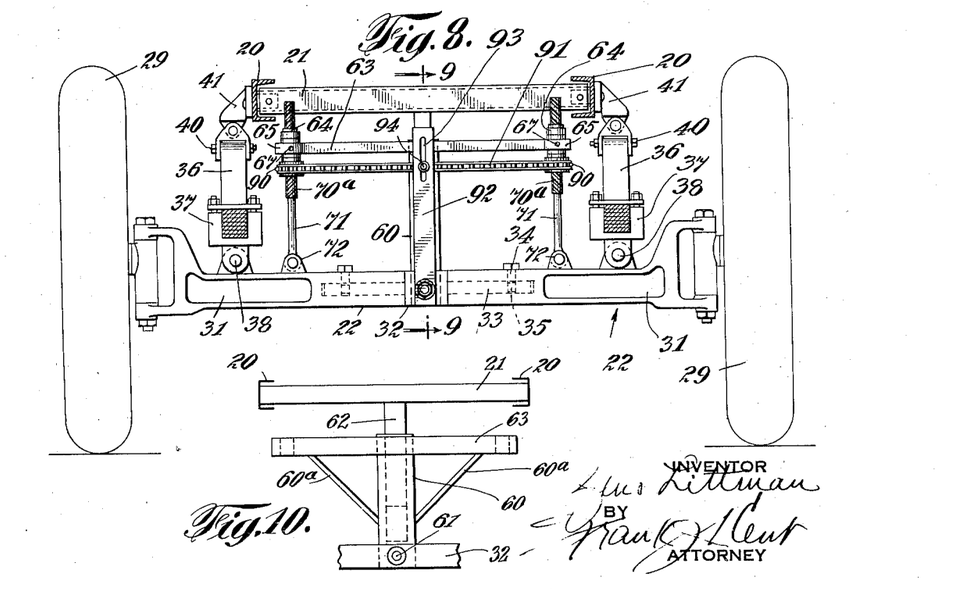
Fig. 8 is a view similar to Fig. 3, showing a modified construction.
Fig. 10 is a detail elevation of the stabilizer guides or T-structures.

I also provide what I call stabilizing mechanism properly correlated to the equalizing mechanism and acting principally, in the present embodiment, to practically prevent lateral tilting of the chassis when one wheel only is moved upward by a road shock. As otherwise described, the stabilizing mechanism is actuated by angular movement of the axle in its own vertical plane and thus definitely positions the corresponding end of the chassis frame in relation to the axle, with the result that the chassis frame is not tilted but remains in horizontal position even in the case of extreme upward movement of one end of the axle. In the present embodiment I provide such equalizing mechanism near the front and the rear of the chassis frame, or adjacent the front and rear axles. Thus, for the front axle, its central block or section 32 above referred to is provided with a vertical guide sleeve 60, the lower end of which is carried by a pivot bolt or trunnion 61 passing through a bearing hole in the axle section 32, and a guide bar 62 is secured to the center of cross frame member 21 above mentioned and extends slidably into the guide sleeve. The bar and sleeve bore are desirably of polygonal or square section, although this is not always essential. A cross-bar 63 is fixedly secured at its center to the guide sleeve 60 near the upper end thereof, and may be braced by diagonal struts 60ᵃ (Fig. 10). A sleeve 64, identified as a "nut sleeve", for a reason which will appear, is mounted for rotation and oscillation in each end of cross-bar 63. For this purpose the ends of the bar are formed with loops or yokes 65, each of which embraces a bearing sleeve 66 having trunnions 67 by which it is pivotally mounted in the loop or yoke, for oscillation in the vertical longitudinal plane of the cross-bar 63. The nut sleeve 64 is revolubly mounted in the bearing sleeve and secured against end motion by a shoulder 68 and a collar 69 fixed to the other end of the nut sleeve. The nut sleeve is internally threaded to engage a thread 70, usually of steep pitch (the pitch angle may in a preferred case be approximately 45°) on the upper portion of a rod 71, which for descriptive convenience I may call a jack rod. The threaded sleeve 64 therefore acts as a nut cooperating with the screw on rod 71. The lower end of each rod 71 is pivotally connected in a lug 72 on one of the axle end portions 31. Each nut sleeve 64 has on its lower end a pinion 73. These and the cooperating pinions to be mentioned might be spiral pinions, but are shown as bevel pinions.

Cross-bar 64 carries dependent bearings 74, supporting aligned shafts 75, the outer ends of which have bevel pinions 76 engaging the corresponding pinions 73 of the nut sleeves, and the inner ends have bevel pinions 77 engaging a bevel gear 78 revolubly mounted on a stub shaft 79 projecting from a vertical guide sleeve 60. Operatively integral with bevel gear 78 is a pinion 80. Rigidly secured to the central axle section 32 is a plate 81, the upper portion of which is formed as a gear sector 82 engaging pinion 80. The lower end portion of plate 81 may be secured to the axle section 32 by pivot bolt 61 above referred to, and prevented from turning in the plane of the axle, in relation to the axle section 32, by flanges 83 thereon engaging the edges of the lower portion of the plate.

This stabilizing mechanism is substantially duplicated near the rear end of the chassis by parts acting intermediate the cross frame member 23 and the rear axle housing.

Figure 3:
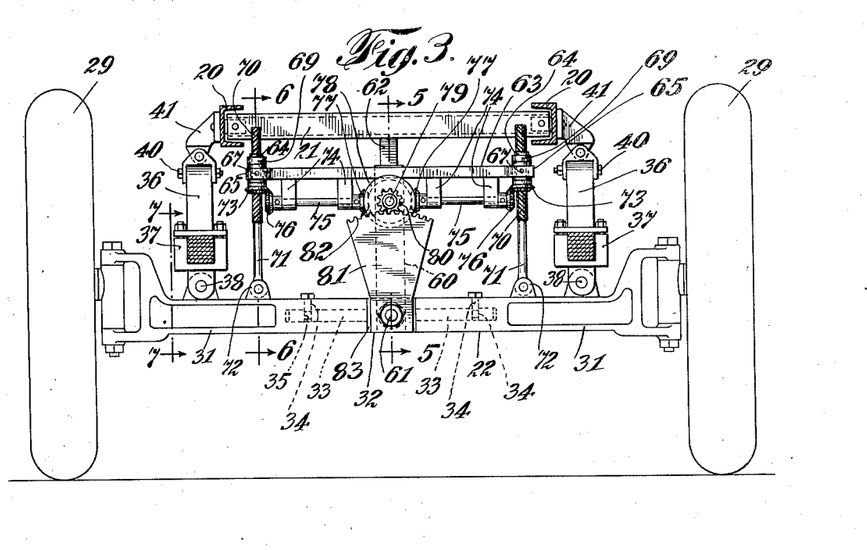
Fig. 3 is a section at 3—3, Fig. 1.
Figure 4:
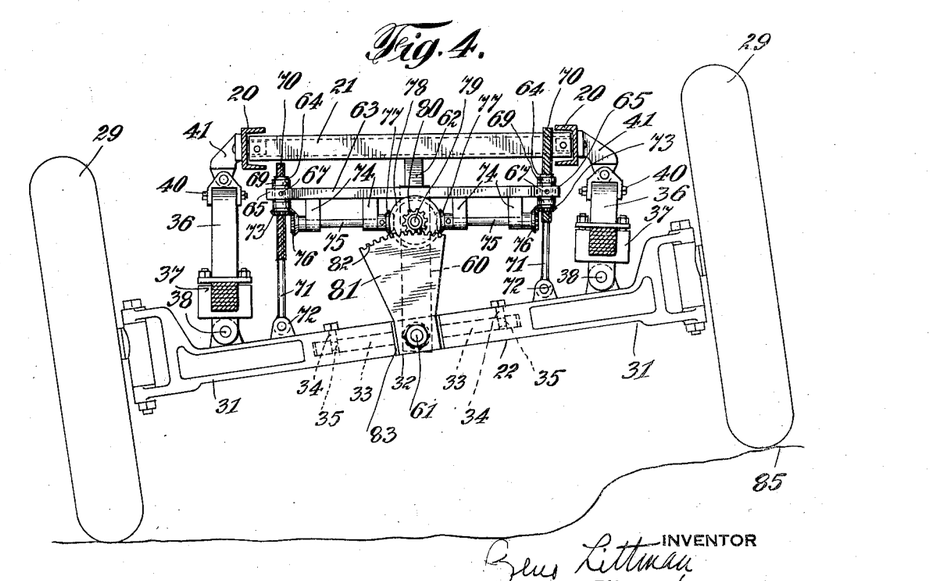
Fig. 4 is a similar section, with the parts in another position.
Figure 5:
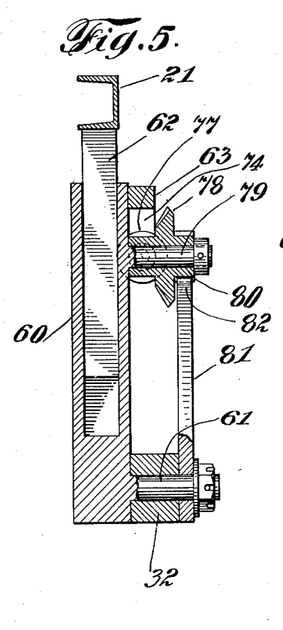
Fig. 5 is a section at 5—5, Fig. 3, enlarged.

It will be noted that, as best understood in Figs. 3, 4 and 5, the stabilizing mechanism does not in itself in any way prevent vertical movement of either axle structure in relation to the chassis frame if any forces tend, for example, to powerfully raise both front wheels (or both rear wheels) at the same time. In such cases, the vertical movement of the axle in relation to the main frame is permitted by the relative sliding of guide bar 62 in the vertical guide sleeve 60.

In operation, when the vehicle is standing, or moving over a smooth horizontal surface, the parts are in normal condition as shown in Fig. 3 with reference to the front end of the car, and it will be understood that the action at the rear end is analogous to that at the front end so that an explanation of the action incident to tilting of the front axle will equally well explain the action at the rear end. If now the left front wheel (Fig. 4) encounters an elevated obstacle on the road surface, as at 85, the impact first causes the wheel to rise and the axle to tilt in its own plane; the main supporting spring 36 at the left is flattened more or less, and in an extreme case even reversely curved, and especially the front portion of the spring is bent or deflected downward. At the same time the front end of this spring acting on the equalizing cross-bar 44 causes that bar to rock in its own plane on the fulcrum formed by its connection to lever arm 47. Unless the shock at one side is unusually severe the shaft 25 and its lever arm 47 will not oscillate, or such oscillation will be only slight, so that the center fulcrum connection of the equalizing cross-bar may be considered for present purposes practically a fixed point. The right-hand end of the equalizing bar is thus caused to move downward and deflect downward the forward portion of the right-hand main spring 36. The result is that the center point—the fulcrum of the equalizing bar, at the longitudinal center of the chassis, is moved upward only slightly. Even if the right-hand main spring is not deflected downward, the motion at the center of the chassis frame is only one-half of the motion at the left-hand end of the equalizing bar, so that due to the arrangement of the equalizing bar alone the chassis lift is limited to half the rise of the left wheel. This lift is however additionally reduced by the deflection of the right-hand main spring, so that the total lift is very slight and the effect of the stated road shock upon passengers is much less than that occuring in ordinary chassis suspensions under the same conditions. At the same time, lateral tilting of the chassis frame is prevented, the front end of the frame remaining in horizontal position, as shown in Fig. 4 even if the axle is tilted to an almost extreme angle as there shown; or as otherwise stated, the stabilizing mechanism definitely acts under control of the stated axle movement to definitely maintain the chassis frame in the stated horizontal position, in the following way: As the left end of the axle begins to rise the gear sector 82 acts on pinion 80 and through bevel gears 78 and pinions 76, on pinion 73, to turn the sleeve nuts 64 in opposite directions about and upon their screws 70. The screw threads both having the same direction or lead (right-hand as shown, or both may be left-hand), the result is that the left hand sleeve nut acts in effect to pull upon the left hand screw and screw rod 71 while the right hand sleeve nut acts to depress the right hand screw and rod to the same extent, the extent of motion depending on the amount of rise of the left end of the axle; and thus the chassis frame is repositioned in relation to the axle with the result that the frame remains in a horizontally stable position. When the left wheel drops to normal position a reverse action takes place, maintaining the chassis frame in horizontal position while the axle returns to horizontal position. The same action takes place if the right wheel rises, as will readily be understood without repeating the explanation for such case.

The stabilizing mechanism thus acts at each end of the car, not only to maintain the horizontal position of the chassis when either axle is tilted, but to definitely maintain the horizontal stability of the frame as for example if greater load is applied to one side than the other, as is demonstrated by a heavy person stepping on a running board of the car. In this case, the screw rods cooperating with the nut sleeves 64 at that side of the car and at either or both ends definitely resist deflection of that side of the chassis, and it is for this reason that the rods 71 may be referred to for descriptive purposes as jack rods, having a supporting function analogous to that of a jack.

If both front wheels or both rear wheels are simultaneously moved upward by encountering a road surface elevation, the front or rear auxiliary spring mechanism is brought into action, the following explanation of the action at the front end being sufficient for an understanding of the rear end action also: In the stated case, supposing that the shock at both wheels is identical, the main springs 36 at both sides of the car are deflected equally, and if this deflection is greater than a predetermined minimum, depending on the characteristics of the springs in relation to car load, etc., all as determined by chassis design, the equalizing cross-bar 44 which in the stated case remains in horizontal position or parallel to the chassis and axle, acts on lever arm 47 and rotates spring shaft 25 in its bearings, thus stretching springs 48, which are of such design or dimensions that they do not normally yield except in case of road shocks greater than a normal minimum, as above referred to. There is thus established in the case of shocks beyond the minimum, a spring action or cushioning effect as between the main springs and the chassis, which not only relieves the stresses on the main springs, but reduces the shock effect upon the passengers. It will now be understood that any combination of excessive or rapid lift of the axle, and at the same time any degree of tilting thereof, will be accommodated by the equalizing and stabilizing mechanisms acting concurrently to bring into action the auxiliary or cushioning springs 48 in case of excessive shocks, and at the same time to maintain the corresponding end of the chassis in horizontal position regardless of angular axle deflection.

When the longitudinal equalizing linkages or connections, consisting principally of the cable connections 56 and 57 as above described, are provided, an additional longitudinal stabilization of the chassis is accomplished in the case of heavy shocks which bring into action the auxiliary or cushioning springs 48 at either end of the vehicle. Thus, in the case above described in which both front wheels are moved sharply upward, causing the front spring shaft 25 to rotated, the lower cables 57 at both sides of the car are pulled forward and act on the long lever arms 50 at the rear of the car to depress the rear center lever arm 47 and so to depress the rear equalizing cross-bar, this force acting on it at its center and tending to move both of its ends down equally. This force is applied to the rear ends of the rear springs, which may be slightly deflected, but the force-reaction obviously tends to raise the rear end of the chassis (both sides equally) to practically the same extent as the front end was raised by the throwing upward of the front wheels. Moreover, the main spring deflection at both ends of the vehicle is thus caused to be practically equal, so that although the chassis as a whole may move slightly up or down, there is little or no tilting in the longitudinal plane, or in other words, the horizontal level of the chassis (parallelism to the normal road surface) is maintained, and thus the pitching, or forward and rearward tilting action so objectionable in ordinary types of chassis suspension is practically eliminated.

It will be noted that torque applied to the axle by deflection of the main springs, or tendency of them to rotate with relation to the axle axis, is taken care of by the pivotal mounting of the axle end portions 31. Thus deflection of one spring can have no tendency to cause deflection of the other, the spring action being independent except as controlled by the equalizing mechanism. It is also seen by comparison of Figs. 3 and 4 that regardless of the tilting of the axle, the springs are maintained practically in their normal perpendicular planes in relation to the chassis, this being permitted by the pivotal mounting at 38 on the axle ends (or sleeves, with reference to the rear structure). It should also be noted that, as will readily be understood from preceding explanation, there are no twisting or bending strains applied to the chassis; consequently, if made of only normal stiffness there is a reduced tendency to distort the body or body frame or cause squeaks and rattles, etc.; also if desired the chassis frame may be made practically rigid and the body or body frame or sill construction correspondingly modified, simplified or cheapened.

Such parts of the stabilizing mechanism as the screw rods 71 may be omitted in some cases, and the guide sleeve 60 cooperating with the bar or plunger 62 telescoping therein will in such cases effect lateral stabilization, by reason of the definite connection of the rear ends of the front springs (for example) to fixed pivotal points on the frame. Thus, if any force tends to depress one side of the chassis, it is impossible for that side to move directly downward merely by compression of the corresponding main spring, as in ordinary constructions; the chassis frame can only tend to move as a whole about a center which is the pivotal connection of sleeve 60 to the axle; this is resisted by the stable connection of the rear spring ends to the frame, and by the straight line guiding of bar 62 in sleeve 60. This is especially true if the screw rods or equivalent "jack" supports are omitted, for example, at the front, and included at the rear. In such case the rear end of the frame is definitely prevented from lateral tilting; the front end is restrained from tilting by the stated action of the front guide members 60 and 62, and in addition the force tending to cause tilting is conveyed through the frame to the rear, and tilting is definitely prevented by the rear screw devices. These devices, when provided, also positively prevent objectionable side sway of the rear end of the car in rounding sharp curves at speed, since it is impossible for one side of the car to sink in response to the centrifugal strain.

But in spite of the definite stabilization against any forces acting first on the body or frame, it will be seen that, as above stated, the axle is always free to oscillate about the center 61, in response to road surface variations.

The invention as represented by the described embodiment is capable of many variations. Thus, as to general plan or arrangement, while I here show equalizing and stabilizing mechanism principally arranged at and duplicated at the front and rear of the chassis, it is evident that similar mechanisms may be arranged at the sides of the chassis, and in that case the equalizing and stabilizing action described with reference to the transverse direction will apply equally to longitudinal stabilization; or in some cases, the equalizing and stabilizing mechanisms or either may be arranged transversely near the center of the chassis, or longitudinally near the center line. It is impracticable to show in a single application all such possible modifications of the general plan or arrangement but such variations are comprehended in the scope of the broader claims.

Figures 6, 7, 9:
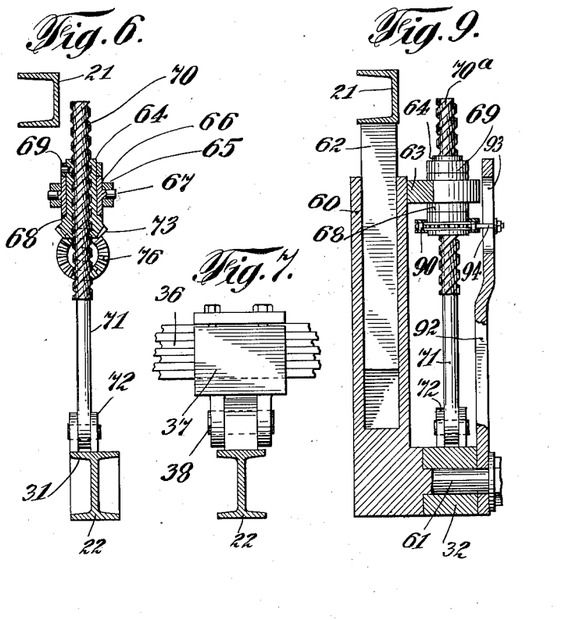
Fig. 6 is a section at 6—6, Fig. 3.
Fig. 7 is a section at 7—7, Fig. 3.
Fig. 9 is a section at 9—9, Fig. 8.

I show in Figs. 8 to 13 some of many possible modifications. Figs. 8 and 9 show especially a modification in the stabilizing mechanism in which a chain and sprockets are substituted for the gear mechanism of Figs. 3 to 6. Thus, the nut sleeves 64 are provided with sprockets 90, and a chain 91 passes about these sprockets. A vertical bar 92 is substituted for the gear sector plate 81 of the previous example. This bar has in its upper end a slot 93 accommodating a stud 94 fixed to one stretch of chain 91 and normally located at the center line of the vehicle. The screws 70ª of the respective screw rods 71 in this instance have opposite leads or pitches (one right-hand and the other left-hand) so that if the axle tilts, bar 92 acts to move chain 91 in one direction or the other and thus to rotate the sleeve nuts and control the chassis position in the manner previously described.

Figures 11, 12, 13, 14:
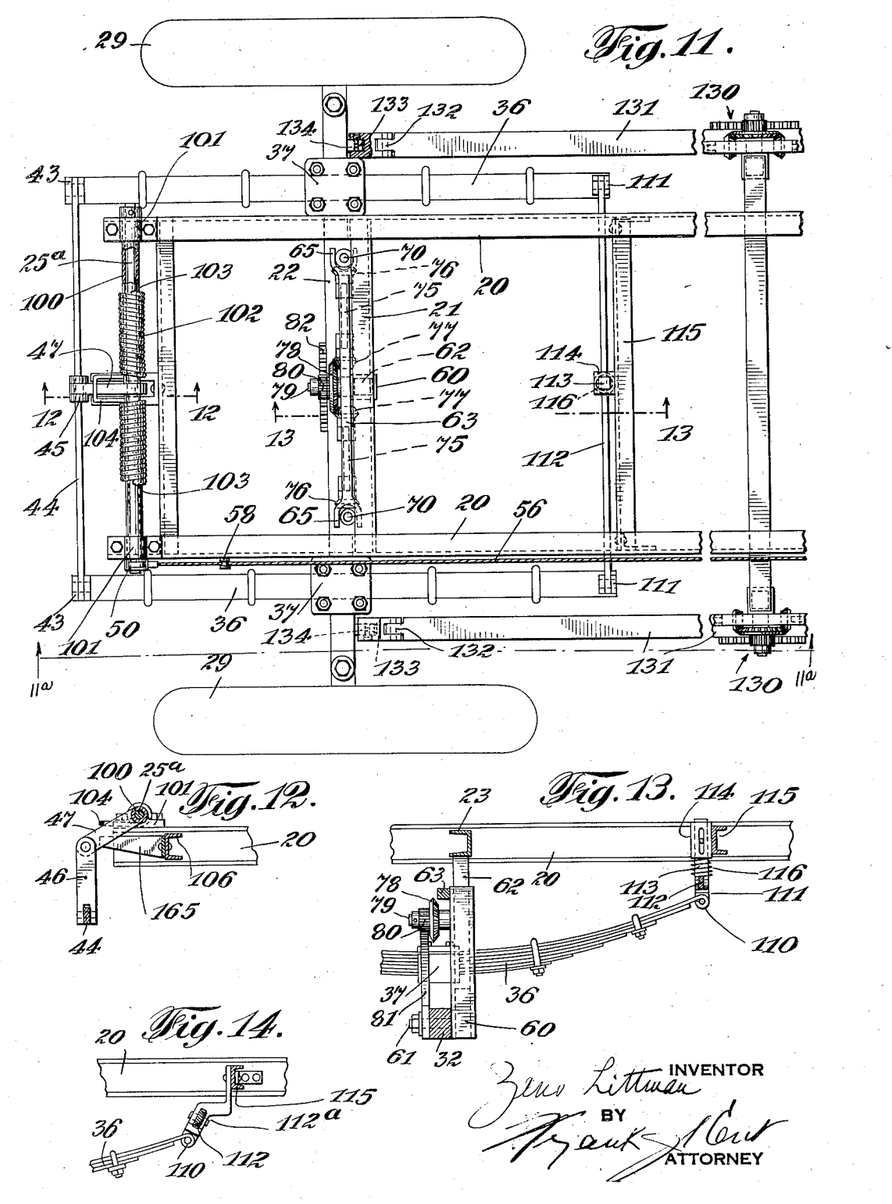
Fig. 11 is a top plan of the front part of a chassis, showing a modified construction.
Fig. 12 is a section at 12—12, Fig. 11.
Fig. 13 is a section at 13—13, Fig. 11.
Fig. 14 is a view similar to Fig. 13, but showing a modified equalizer-bar arrangement.
Figure 11A:
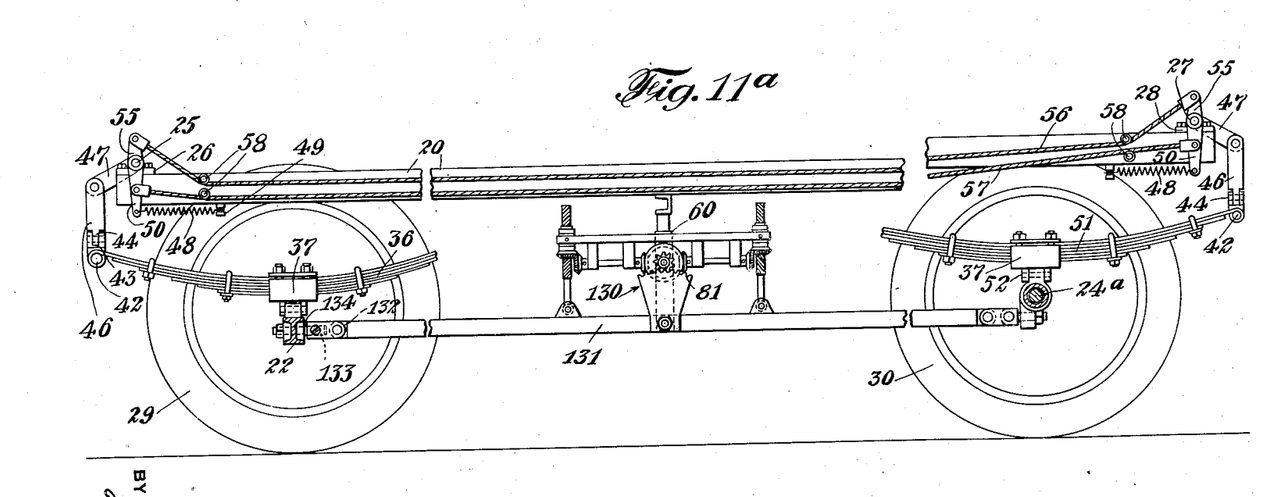
Fig. 11a is a sectional elevation taken on line 11a—11a of Fig. 11.

Figs. 11, 12 and 13 show a modification of the auxiliary or cushion spring arrangement or mechanism. The forward spring shaft 25ª is revolubly mounted in sleeves 100, the ends of which are keyed or otherwise fixed in brackets 101 secured to the side frame members 20. Lever arms 50 are secured to the outer ends of the shaft as previously and for a similar purpose. Lever arm 47 is connected to the center of the shaft and to the equalizing cross-bar 44, also as previously. The inward ends of sleeves 100 terminate adjacent the lever arms 47. A torsion spring having its end portions 102 helically coiled in opposite directions, has such portions located about the respective sleeves 100 and their ends connected to the sleeves as at 103. The central part of this continuous spring is formed as a yoke portion 104, the transverse part of which overlies lever 47 near its outer end so that the spring normally resists upward movement of the lever and rotation of shaft 25ª, as in the previous case. I provide also spring abutment arms 105 projecting from a cross frame member 106, and these abutments underlie portions of the spring yoke 104, at each side of lever 47. The principal advantage of this arrangement is that in case of a rapid descent of the front axle, the auxiliary spring will, at about the time the axle reaches normal position in relation to the chassis frame, (that is the position in which the main springs are in normal form), the yoke portion of the auxiliary spring will encounter the abutments and thereafter the auxiliary spring cannot act to accelerate the downward movement of the axle in relation to the frame. Thus any tendency of the auxiliary spring to amplify upward rebound of the chassis (for example) is greatly reduced or eliminated.

Figs. 11 and 13 also show a modified support for the chassis upon the rear ends of the front springs. In this arrangement the rear spring eyes 110 are connected by shackles 111 similar to 43 of the previous example, to the ends of a rearward transverse equalizing bar 112, which may be pivotally connected at its center, to a fixed point on the chassis center-line, as at 112ª, Fig. 14. This cross-bar tends to equalize the action of the rear portion of the front springs in a manner analogous to the equalization at the front ends, as will readily be understood without detailed description. I also desirably include auxiliary cushioning or spring means intermediate the equalizing cross-bar and the frame. Thus, a plunger 113 is pivotally connected at the center of the cross-bar and passes upward through a guide sleeve 114 secured to a cross frame member 115. A spring 116 is placed about the plunger and acts between sleeve 114 and the cross-bar to cushion it in relation to the chassis at a central point in an obvious way.

Obviously the modifications of Figs. 11 to 13 may be incorporated in the rear equalizing structures as well as those at the front.

Fig. 11 also shows longitudinal stabilizers 130 substantially similar to the front and rear stabilizers above described except that the lower portions of the equalizing mechanism including the guide sleeves 60 and gear sectors 81, are mounted on longitudinal strut bars 131 supported by the front and rear axles at each side of the car. At at least one end each of these strut bars has a pivotal connection to the axle; thus the forward ends of the bars are, as shown, provided with a swivel mounting 132 in a block 133 which is pivotally connected at 134 on a horizontal axis to the front axle end member. By this arrangement the normal tortional movements of the front and rear axles are not impeded; the strut bars serve to maintain the axles and springs in proper positions, when, for example, the rear ends of the front springs are mounted in the manner shown in Figs. 11 and 13; and the same also with regard to the front ends of the rear springs if similarly mounted. The side stabilizing devices arranged as shown have practically the same action as the front and rear devices above described except that in this case the longitudinal strut bar 131 practically takes the place of an axle and the stabilizer at each side controls the position of the chassis frame with respect to forces which would tend to cause longitudinal tilting. Various other arrangements of equalizing mechanism may be provided as referred to previously.

Figure 15:
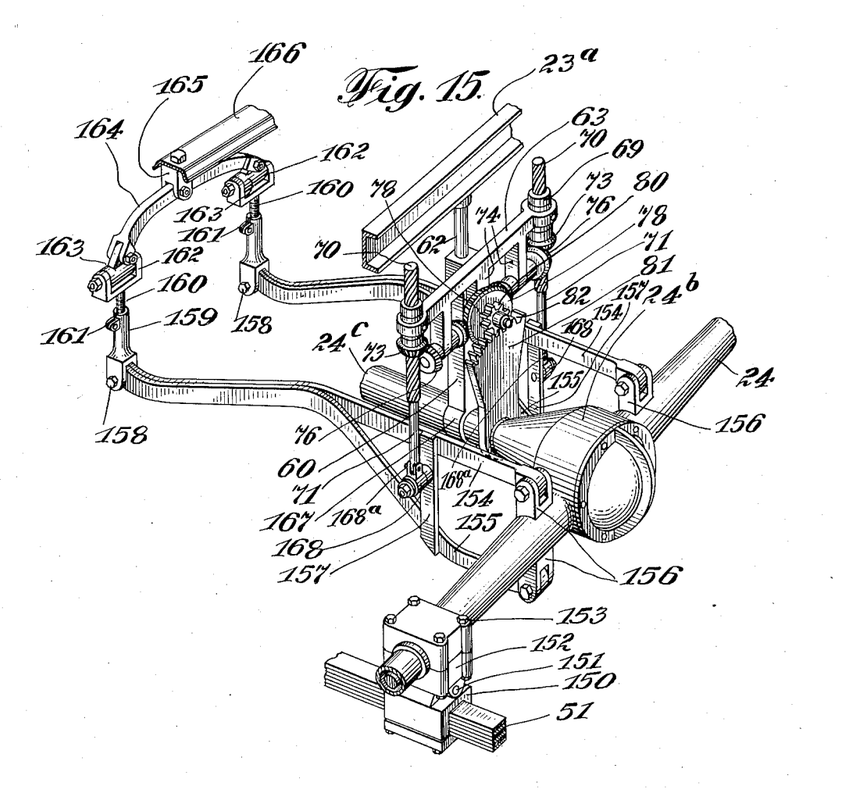
Fig. 15 is a perspective view of a preferred form of the stabilizing mechanism.
Figure 16:
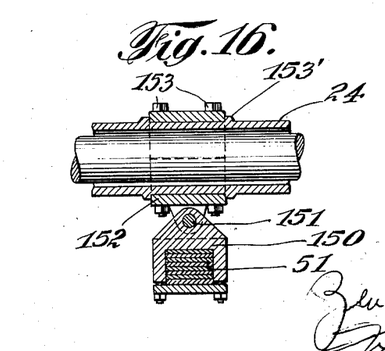
Fig. 16 is a sectional detail.

Fig. 15 shows a stabilizing structure, and location or arrangement thereof, which are preferred in some cases. This stabilizing mechanism is, as shown, associated with the rear axle, and also includes one example of suitable lever arms to take up torque and properly support and control the movement of the axle in such manner that there is no interference with the proper action of the stabilizing and equalizing mechanism. In this instance, the rear springs 51 are clamped in spring holders 150 and the holders are pivoted on longitudinal axes 151 at the lower sides of spring supports 152, made in two parts, secured together by bolts 153 and arranged to oscillate on the axle sleeves, being prevented from end motion by flanges 153' thereon. At each side of the differential housing 24ᵇ, is a lever arm structure consisting of upper and lower rods 154 and 155 pivoted respectively above and below the axle sleeve in lugs 156 thereon. The branch or forked portions of the rods may be connected by a vertical member 157 welded or otherwise rigidly secured. The forward parts of the rods may be secured together, or both of them may be pivotally connected on a transverse axis 158 in the lower end of a sleeve 159. A threaded rod 160 is adjustably located in each sleeve and secured in adjusted position by clamp 161. The rod has a fork or yoke 162 at its upper end, providing for the mounting of a double link or shackle 163 to which a transverse equalizing bar 164 is connected, so that the two lever arm structures at opposite sides of the differential housing have practically universal connection to the opposite ends of the transverse lever arm equalizer 164. This equalizer is pivotally connected at its center in a lug 165 carried by a cross frame member 166. The preferred arrangement is such that the pivot axles 158 are normally in line with each other and with the pivot eyes at the front ends of the rear springs, so that the axle is controlled in its vertical movements from the same centers as the spring connections, thus avoiding twisting strains on the springs or interference with the normal spring action and at the same time equalizing the torque control in accordance with axle tilting.

The stabilizing mechanism proper is practically as previously described with reference to Figs. 3 and 4, except that the gear sector plate 81 is rigidly connected at the forward end of the differential housing or on the rearward part of the propeller shaft sleeve 24ᶜ, while the vertical guide sleeve 60 is oscillatably mounted at 167 on the propeller shaft sleeve; the vertical guide bar 62 is connected at the center of the cross frame member 23ᵃ, and the screw rods 71 are pivotally mounted at 168 on the vertical braces 157.

The stabilizing action is the same as previously described, and it should be noted that in some cases, when such stabilizing mechanism is provided for the rear axle, it is unnecessary to provide stabilizing mechanism at the front axle, since the frame position will be sufficiently stabilized by the rear mechanism and in such cases, it is only necessary to provide equalizing mechanism at the front end; and of course, for the structure of Fig. 15 rear equalizing mechanism will also be provided, of the general character previously described.

In a broad sense, the chassis frame 20 represents a platform or analogous structure carried by four main supports, which in this case are the wheels, but in a floating structure may be floats, and in such case the stabilizing or equalizing mechanism, suitably adapted, will keep the platform practically horizontal, regardless of the varying "level" of the floats. The number of main supports may also be varied, as for example, in adapting the invention to a vehicle of the "tricycle" type.

I claim:

1. In a motor vehicle, in combination with the chassis frame, springs, axles and wheels, supporting and equalizing mechanism including means connected to similar ends of corresponding springs and also connected to the frame at an intermediate point and acting upon vertical movement of either end of an axle to lift the frame no more than half the distance of said vertical movement, and auxiliary cushioning means acting between said first mentioned means and the frame upon considerable simultaneous lifts of both ends of an axle to yieldingly convey the movement of the springs to the frame.

2. In a motor vehicle, in combination with the chassis frame, axles and wheels, supporting and equalizing mechanism intermediate the axles and frame and including means acting upon a tilting movement of an axle to move the frame vertically at an intermediate point a less distance than the vertical movement of the axle end, and stabilizing mechanism operatively intermediate the axles and frame for substantially preserving the normal horizontal position of the chassis frame regardless of tilting movement of the axles, the stabilizing mechanism including a movable connection between an axle and the frame admitting relative vertical movement of the frame and axles.

3. In a motor vehicle, in combination with the chassis frame, axles and wheels, supporting and equalizing mechanism intermediate the axles and frame and including means acting upon a tilting movement of an axle to move the frame vertically at an intermediate point a distance no more than one-half the vertical movement of an axle end, and stabilizing mechanism operatively intermediate the axles and frame for definitely maintaining the normal horizontal position of the chassis frame regardless of tilting movements of the axles, the stabilizing mechanism including a movable connection between an axle and the frame admitting relative vertical movement of the frame and axles in all axle positions.

4. In a motor vehicle, in combination with the frame, wheels, axles, and main springs, of a generally horizontal substantially rigid bar, the ends of which have articulated connection to similar ends of corresponding main springs, and connection between an intermediate point of the bar and a horizontally intermediate point of the frame, said last named connection including cushioning means acting principally in case of simultaneous lift of both ends of the corresponding axle.

5. In a motor vehicle, in combination with the frame, wheels, axles, and main springs, of a generally horizontal bar, the ends of which have articulated connection to similar ends of corresponding main springs, a shaft on the frame, a spring acting between the shaft and the frame, and a connection between the bar and the shaft, said spring tending to oppose the action of the main springs.

6. In a motor vehicle, in combination with the frame, wheels, axles, and main springs of a generally horizontal bar, the ends of which have articulated connection to similar ends of corresponding main springs, a shaft on the frame, an arm on the shaft, a connection from the arm to the bar, and spring means acting between the shaft and the frame.

7. In a motor vehicle, in combination with the frame, wheels, axles, and main springs of a generally horizontal bar, the ends of which have articulated connection to similar ends of corresponding main springs, a shaft on the frame, an arm at a central position on the shaft, a link connection from the arm to the center of the bar, and spring means acting between the shaft and the frame and normally providing relatively fixed support of the frame.

8. In a motor vehicle, in combination with the frame, wheels, axles, and main springs, of a generally horizontal bar, the ends of which have articulated connection to similar ends of corresponding main springs, and an articulated connection between an intermediate point of the bar and a horizontally intermediate point of the frame, said last named connection including cushioning means acting principally in case of simultaneous lift of both ends of the corresponding axle, and a stop for the cushioning means limiting its action in the downward direction.

9. In a vehicle, in combination with the main frame, axles and wheels, equalizing means intermediate the axles and the frame and acting to accommodate lift of either wheel relative to the frame with proportionally reduced lift of the frame, and stabilizing mechanism acting between a central point on an axle and the frame and controlled by axle tilting whereby the normal horizontal leveling of the frame is maintained, the stabilizing mechanism including an operating member connected to a central point on the axle, screw rods on the axle, nuts on the rods, and means interconnecting the nuts and the frame to reposition the chassis frame simultaneously with axle tilting.

10. In a vehicle, in combination with the main frame, axles and wheels, equalizing means intermediate the axles and the frame and acting to accommodate lift of either wheel relative to the frame with proportionally reduced lift of the frame, and stabilizing mechanism acting between a central point on an axle and the frame and controlled by axle tilting whereby the normal horizontal leveling of the frame is maintained, the stabilizing mechanism including an operating member connected to a central point on the axle, screw rods on the axle, nuts on the rods actuated by movement of said operating member, to guide means operatively intermediate the axle and frame and admitting free relative vertical movement thereof, and means interconnecting said nuts and the guide means to maintain the guide means vertical as the axle tilts.

11. In a vehicle, in combination with the main frame, axles and wheels, equalizing means intermediate the axles and the frame and acting at a substantially central point thereof to accommodate lift of either wheel relative to the frame with proportionally reduced lift of the frame, and stabilizing mechanism acting between a central point on an axle and the frame and controlled directly by axle tilting whereby the normal horizontal leveling of the frame is maintained, the stabilizing mechanism including an operating member connected to a central point on the axle, screw rods on the axle, nuts on the rods actuated by movement of said operating member, and means interconnecting the nuts and frame to reposition the chassis frame simultaneously with axle tilting.

12. In a vehicle, in combination with the main frame, axles and wheels, equalizing means intermediate the axles and the frame and acting at a substantially central point thereof to accommodate lift of either wheel relative to the frame with proportionally reduced lift of the frame, and stabilizing mechanism acting between a central point on an axle and the frame and controlled directly by axle tilting whereby the normal horizontal leveling of the frame is maintained, the stabilizing mechanism including an operating member connected to a central point on the axle, screw rods on the axle, nuts on the rods actuated by movement of said operating member, guide means operatively intermediate the axle and frame and admitting free relative vertical movement thereof, and means interconnecting said nuts and the guide means to maintain the guide means vertical as the axle tilts.

13. In a motor vehicle, a chassis frame, an axle having relatively revoluble spring supports, main springs on the supports, and equalizing means acting between similar ends of the springs and the frame, and other equalizing means intermediate the other similar ends of the springs and the frame.

14. In a motor vehicle, a chassis frame, an axle having spring supports, main springs on the supports, equalizing means acting between similar ends of the springs and the frame, and other equalizing means intermediate the other similar ends of the springs and the frame.

15. In a motor vehicle, a chassis frame, an axle having spring supports, main springs on the supports, equalizing means acting between similar ends of the springs and the frame, and auxiliary spring means acting intermediate the equalizing means and the frame.

16. In a motor vehicle, a chassis frame, an axle including a central section and independently revoluble end sections, main springs on the end sections, and equalizing means acting between similar ends of the springs and the frame, the spring supports being pivotally mounted on the axle end sections to admit maintenance of normal vertical positions of the springs.

17. In a motor vehicle, a chassis frame, an axle including a central section and independently revoluble end sections, main springs on the end sections, and equalizing means acting between similar ends of the springs and the frame, the spring supports being pivotally mounted on the axle end sections with the pivot axes in transverse relation to the axle.

18. In a motor vehicle, a chassis frame, a tubular rear axle housing, spring supports revolubly mounted on the housing, main springs pivotally mounted on the supports, and equalizing mechanism intermediate similar ends of the springs and the frame.

19. In a motor vehicle, a chassis frame, a tubular rear axle housing, spring supporting sleeves revolubly mounted on the housing, main springs pivotally mounted on the supporting sleeve, and equalizing mechanism intermediate similar ends of the springs and the frame.

20. In a motor vehicle, in combination with the chassis frame, front and rear axles, equalizing mechanism intermediate each axle and the frame and including oscillatable spring shafts, springs acting between the spring shafts and the frame, and equalizing connections between the front and rear spring shafts.

21. In a motor vehicle, in combination with the chassis frame, front and rear axles, equalizing mechanism intermediate each axle and the frame and including oscillatable spring shafts, springs acting between the spring shafts and the frame, levers on the spring shafts, and cable connections between the levers of the two shafts.

22. In a motor vehicle, in combination with the chassis frame, front and rear axles, equalizing mechanism intermediate each axle and the frame and including oscillatable spring shafts, springs acting between the spring shafts and the frame, levers on the spring shafts, and cable connections between the levers of the two shafts, and guides for the cables along the frame side members.

ZENO LITTMAN.